United States Patent [19]
Robertson

[11] 3,834,237
[45] Sept. 10, 1974

[54] THERMOCOUPLE FOR SURFACE TEMPERATURE MEASUREMENTS

[75] Inventor: Donald Robertson, Ambler, Pa.

[73] Assignee: Leeds & Northrup Company, North Wales, Pa.

[22] Filed: Oct. 5, 1972

[21] Appl. No.: 295,306

[52] U.S. Cl................. 73/359, 73/DIG. 7, 136/230
[51] Int. Cl........................... G01k 7/04, H01v 1/04
[58] Field of Search................. 73/DIG. 7, 341, 359; 136/230

[56] References Cited
UNITED STATES PATENTS

| | | | |
|---|---|---|---|
| 3,007,990 | 11/1961 | Inhat................................... | 136/230 |
| 3,151,484 | 10/1964 | Feehan et al. ......................... | 73/359 |
| 3,321,974 | 5/1967 | Sterbutzel............................. | 73/359 |
| 3,332,285 | 7/1967 | Cook ................................... | 73/359 |
| 3,354,720 | 11/1967 | Hager................................. | 73/355 R |
| 3,525,260 | 8/1970 | Kung.................................. | 73/355 R |
| 3,529,473 | 9/1970 | Hager................................. | 73/355 R |
| 3,715,923 | 2/1973 | Hornbaker et al................ | 73/359 X |

*Primary Examiner*—James J. Gill
*Assistant Examiner*—Frederick Shoon
*Attorney, Agent, or Firm*—William G. Miller, Jr.; Raymond F. MacKay

[57] ABSTRACT

The improved surface temperature probe is of the type which utilizes a heater and a differential temperature measurement to control the heater so as to minimize the temperature gradient along the probe. The improvement comprises the protective shielding of the thermocouple junctions by a metal shield and the addition of supplementary heater sections to heat the shield so as to minimize the temperature gradient between the shield and the surface being measured.

2 Claims, 1 Drawing Figure

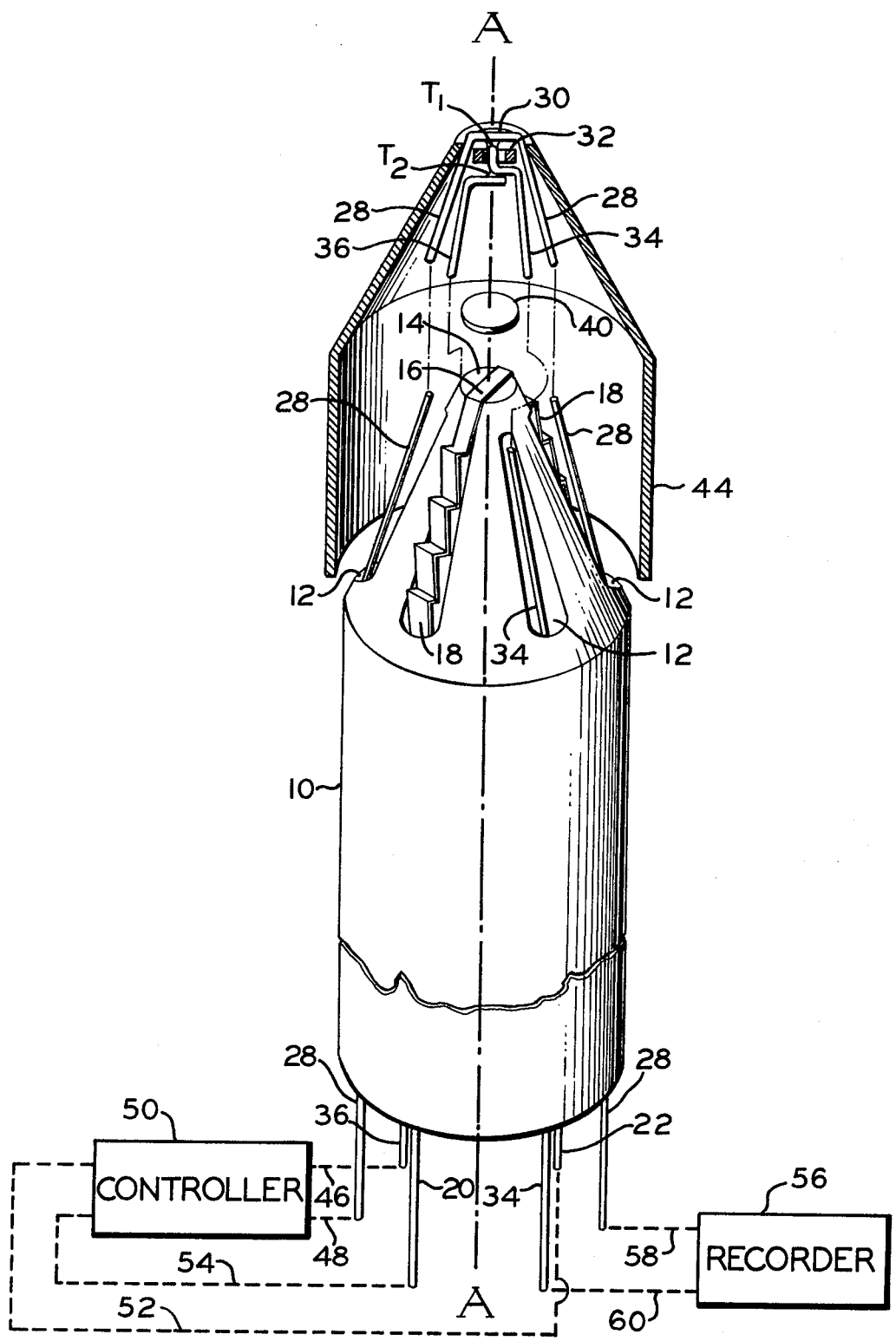

3,834,237

THERMOCOUPLE FOR SURFACE TEMPERATURE MEASUREMENTS

BACKGROUND OF THE INVENTION

This invention relates to an improvement in surface temperature measuring probes. More particularly, the invention relates to an improvement in high speed surface temperature measuring probes of the type which utilize in addition to the measuring thermocouple, an auxiliary thermocouple and heater with a control system arranged to vary the heater current until there is no detectable temperature gradient due to the contact of the measuring thermocouple and the surface to be measured. This minimum gradient is established when the temperature difference between the two thermocouples is reduced to zero.

One prior art device utilizes an elongated ceramic insulator having a heater coil wrapped spirally around the end with the measuring thermocouple junction and control thermocouple junction. The measuring junction contacts the surface to be measured and the control junction is displaced therefrom so that the temperature difference between the two detects temperature gradients which are minimized by adjustment of the heater current. Such an arrangement is shown in one form in FIG. 1 on page 444 of the Review of Scientific Instruments, Vol. 34, Apr., 1963.

Another prior art device is shown in U.S. Pat. No. 3,321,974 issued to G. A. Sterbutzel on May 30, 1967. FIG. 13 of that patent shows a form of the surface temperature measuring probe of which this invention is an improvement.

Probes of the type shown in FIG. 13 of the above mentioned patent typically have the ends of the probe, with the exception of the portion to be in contact with the surface whose temperature is to be measured, covered with a ceramic cement and a fired ceramic coating, as taught in the patent. Applicant has found that such coverings are not suitable for industrial environments in that they do not provide sufficient protection for the end of the probe. The end of the probe is therefore subject to damage in normal industrial use. It is therefore an object of the present invention to provide a surface temperature measuring probe less subject to being damaged in an industrial environment, but still capable of accurately measuring the surface temperature by minimizing thermal gradients between the probe and the surface whose temperature is to be measured.

SUMMARY OF THE INVENTION

The novel high speed surface temperature measuring probe which is the subject of this invention is typically constructed with an elongated multibore insulator which carries a first thermocouple means for contacting the surface whose temperature is to be measured, a first insulation means, a second thermocouple means, second insulation means, and heater means. All of these means are arranged in heat exchange relation and superposed in the order named so that the thermocouples are electrically insulated from each other and the heater is electrically insulated from the thermocouples. The superposed combination is substantially coextensive with and facing the surface region spanned by the first thermocouple means which is in contact with the surface. The probe is of the type which utilizes control of the heater current in response to the temperature difference detected between the first and second thermocouple means to control the flow of current through the heater so that the temperature difference is maintained substantially at zero, thus indicating the elimination of any detectable heat flow to the probe from the surface with which it is in contact. The improvement comprises a protective metal shield overlaying the area of the probe adjacent that portion of the first thermocouple means in contact with the surface being measured, and an additional heater means which is oriented in sufficient heat exchange relationship with the protective metal shield so as to minimize the net heat flow between the shield and the surface.

BRIEF DESCRIPTION OF THE DRAWING

The FIGURE shows a view of the novel thermocouple probe which is exploded along the axis A—A and in which the body of the probe, one of the insulators and the shield are shown in perspective view with the thermocouple means and the other insulator being shown in elevation and partially in cross-section for purposes of clarity.

DESCRIPTION OF THE PREFERRED EMBODIMENTS

In the FIGURE the thermocouple probe is shown with a body 10 which consists of a ceramic insulator having six equally spaced holes 12 around the periphery. An end of the ceramic body 10 is reduced so that a tip having the shape of a conic frustum is formed. This tip provides a narrow end platform 14 which supports the heater means shown as a ribbon section 16. Additional heater means are provided on opposite sides of the tip by the accordian pleated sections of ribbon 18. Leads to the heater means 14 and 18 which are serially connected are shown extending from the other end of the body 10 as leads 20 and 22. The heater may be constructed from a platinum alloy having 10 percent rhodium and the leads from the heater may be made of silver, for example. A wire 28 of positive thermocouple alloy passes through one set of opposing holes 12 and over the platform 14 to provide a surface 30 for contact with the surface whose temperature is to be measured. That thermocouple wire may, for example, be made from the alloy known as Chromel. Typically, the Chromel wire or ribbon 28 may be of 36 gauge or equivalent cross-sectional area. A small insulator ring 32 underlays and provides electrical insulation for that portion of the strip 28 which overlays the platform 14 and forms the surface 30.

A first thermocouple junction is formed by welding a wire 34 of negative thermocouple alloy to the underside of that portion of the wire 28 forming the surface 30. The wire 34 may be a 36 gauge thermocouple alloy known as Alumel so that there is formed a first thermocouple junction $T_1$. The wire 34 extends through the center of the insulator ring 32, shown in cross-section, to form the junction with the wire 28. Another 36 gauge wire 36 of a positive thermocouple alloy such as Chromel is welded to wire 34 to form a second thermocouple junction $T_2$ which is positioned on an opposite side of the insulator ring 32 from thermocouple junction $T_1$.

An insulator disc 40 is positioned between the thermocouple junction $T_2$ and the heater section 16 to electrically insulate the heater section 16 from the thermocouple junction $T_2$.

As will be seen from the drawing, the thermocouple wires identified as 34 and 36 are shown as being fed through a separate set of opposing holes 12 in the body 10 and for the purposes of illustration the portions adjacent the thermocouple junctions are shown in elevation as they would appear if they were rotated through 60 degrees in a counterclockwise direction looking down on the probe from the contact surface 30. In the view of the FIGURE, only the hole which carries the wire 34 is in view, while the hole which carries wire 36, being on the opposite side of body 10, is out of view.

The wires 28, 34 and 36 extend axially from the tip of the probe through the holes 12 in the body 10 and extend out from the other end of the body 10, as shown.

The tip of the probe is protected by an overlaying metal shield 44 which has a portion which is cylindrical in shape and of diameter which is adequate to provide a frictional fit with the cylindrical portion of the body 10 just adjacent the reduced tip. The metal shield 44 has an open ended conical section which has a taper to match the taper of the tip of the body 10 so that it can be positioned over the tip of the body 10 with its axial orientation with respect to the body 10 being such that there is a small space between the conical portion of the shield 44 and the heater sections 18, as well as the wires 28, 34 and 36. The axial placement of the shield 44 is also such that the surface 30 protrudes from the opening in the end of the shield so that the shield will not come in contact with the surface to be measured. It will thus be evident that the shield 44 will provide a protective covering for the entire end of the probe while exposing the surface 30.

During construction of the probe the tip of the body 10 is covered with a ceramic cement so that the ceramic cement will fill the space between the body 10 and the shield 44 when the shield is in its proper position and will also serve to maintain the shield in that position during use.

As shown in the FIGURE, the thermocouple wires 28 and 36 on the left side are connected by lead wires 46 and 48 to a controller 50 which is in turn connected by leads 52 and 54 to the heater leads 22 and 20, respectively. Whenever a potential difference appears between the wires 28 and 36 as a result of a temperature difference between the junctions $T_1$ and $T_2$, the controller 50 is effective to change the current through the heater elements 16 and 18 until the potential difference and hence the temperature difference between the junctions $T_1$ and $T_2$ is reduced to zero. At that time there is no detectable temperature gradient between the junctions $T_1$ and $T_2$ and hence there is no detectable heat flow from the surface whose temperature is to be measured, as a result of the contact of the probe with the surface being measured.

It has been found that the addition of the metal shield 44 without the addition of the heater elements 18 causes a heat flow in that there is a thermal gradient established between the surface to be measured and the shield itself. That heat flow to the shield would, under normal circumstances, produce a reduction of the temperature of the surface in contact with the surface 30 and a resulting measurement error even though no detected thermal gradient existed between the thermocouple junctions $T_1$ and $T_2$. Applicant has found that it is necessary to introduce the additional heater sections 18 in order to eliminate the error caused by the introduction of the shield. Those additional heater sections 18 must provide sufficient heat exchange with the shield 44 so that the net heat flow from the surface being measured to the shield is substantially zero.

With the arrangement shown, the recorder 56, which is connected by leads 58 and 60 to the thermocouple wires 28 and 34, respectively, can serve to record accurately the temperature of the surface to be measured since there will not be produced any net heat flow from that surface to the probe.

It will be evident to those skilled in the art that the detailed structure of the probe shown in the FIGURE may be varied while still retaining the useful nature of the improvement described. Likewise, the material may be changed as desired. For example, the wires forming the thermocouple junctions may be of metal or metal alloys other than those mentioned, there being many combinations of alloys and metals which form suitable thermocouple junctions. Likewise, the polarity of the wires may be reversed from that described and, depending on the speed of response desired, the wires may be larger in cross-sectional area. Also, individual couples may be used instead of the structure shown.

What is claimed is:

1. In a surface temperature measuring probe having an elongated multibore insulator carrying a first thermocouple means contactable with the surface, the temperature of which is to be measured, first insulation means, a second thermocouple means, second insulation means, and heater means, all of said means being in heat exchange relation and superposed in the order named to insulate said thermocouples from each other and said heater from said thermocouples, with the superposed combination of said means substantially coextensive with and facing the region of the surface spanable by contact with said first thermocouple means, said probe being of the type in which said heater is normally controlled in response to the temperature difference detected by said first and second thermocouple means to control the flow of current through said heater so that said difference is maintained substantially at zero to eliminate any net heat flow between said first thermocouple means and said surface upon contact therewith, the improvement comprising:

a protective metal shield fixed in overlaying relationship to the area of said probe adjacent the portion of the first thermocouple means contactable with the surface, and additional heater means in the space between the multibore insulator and the shield and surrounded by ceramic cement so that said cement fills said space, said heater means being in sufficient heat exchange relationship with said shield to eliminate any net heat flow between said shield and said surface when said first thermocouple means is in contact with said surface.

2. In a surface temperature measuring probe having an elongated multibore insulator with an end tapered to form a conic frustum so that said end carries a first thermocouple means contactable with the surface, the temperature of which is to be measured, first insulation means, second thermocouple means, second insulation means, and heater means, all of said means being in heat exchange relation and superposed in the order named to insulate said thermocouples from each other and said heater from said thermocouples, with the superposed combination of said means substantially coextensive with and facing the region of the surface spanable by contact with said first thermocouple means, said probe being of the type in which said heater is normally controlled in response to the temperature difference detected by said first and second thermocouple means to control the flow of current through said heater so that said difference is maintained substantially at zero to eliminate any net heat flow between said first thermocouple means and said surface upon contact therewith, the improvement comprising:

a protective metal shield shaped like a conic frustum and fixed in overlaying relationship to the portion of the insulator shaped like a conic frustum, said shield being open at both ends to allow contact between the first thermocouple means and the surface whose temperature is to be measured, and additional heater means in sufficient heat exchange relationship with said shield to eliminate any net heat flow between said shield and said surface when said first thermocouple means is in contact with said surface.

\* \* \* \* \*